(12) United States Patent
Kolahi

(10) Patent No.: US 8,104,361 B2
(45) Date of Patent: Jan. 31, 2012

(54) METHOD FOR OPERATING A RESONANCE-MEASURING SYSTEM AND A RESONANCE-MEASURING SYSTEM

(75) Inventor: Kourosh Kolahi, Duisburg (DE)

(73) Assignee: KROHNE Messtechnik GmbH, Duisburg (DE)

( * ) Notice: Subject to any disclaimer, the term of this patent is extended or adjusted under 35 U.S.C. 154(b) by 233 days.

(21) Appl. No.: 12/629,161

(22) Filed: Dec. 2, 2009

(65) Prior Publication Data

US 2010/0139417 A1 Jun. 10, 2010

(30) Foreign Application Priority Data

Dec. 2, 2008 (DE) .......................... 10 2008 059 920

(51) Int. Cl.
*G01F 1/84* (2006.01)
(52) U.S. Cl. .................................................. 73/861.357
(58) Field of Classification Search ............. 73/861.355, 73/861.356, 861.357
See application file for complete search history.

(56) References Cited

U.S. PATENT DOCUMENTS 7,360,453 B2 * 4/2008 Rieder et al. ............. 73/861.357
7,412,903 B2 * 8/2008 Rieder et al. ............. 73/861.357

* cited by examiner

*Primary Examiner* — Jewel V Thompson
(74) *Attorney, Agent, or Firm* — Roberts Mlotkowski Safran & Cole, P.C.; David S. Safran

(57) ABSTRACT

A method for operating a resonance-measuring system, in particular, a Coriolis mass flowmeter, having at least one oscillation element, at least one oscillation driver and at least one oscillation sensor, the oscillation element being excited to oscillation in at least one control using at least one control loop by at least one oscillation driver being excited by at least one excitation signal and the excited oscillations of the oscillation element being detected by the oscillation sensors as at least one response signal. At least one set variable of the closed loop is varied in a pre-determined manner and by evaluating at least one resulting excitation signal and/or at least one resulting response signal with the help of a mathematical model of the resonance-measuring system, at least one parameter of the excited eigenform is selectively identified.

16 Claims, 5 Drawing Sheets

METHOD FOR OPERATING A RESONANCE-MEASURING SYSTEM AND A RESONANCE-MEASURING SYSTEM

BACKGROUND OF THE INVENTION

1. Field of Invention

The invention relates to a method for operating a resonance-measuring system, in particular a Coriolis mass flowmeter, wherein the resonance-measuring system includes at least one oscillation element, at least one oscillation driver and at least one oscillation sensor, wherein the oscillation element (is excited to oscillation in at least one eigenform from at least one control in at least one control loop by at least one oscillation driver excited by at least one excitation signal and the excited oscillations of the oscillation element are detected by the oscillation sensors as at least one response signal. In addition, the invention relates to a resonance-measuring system that is operated using such a method.

2. Description of Related Art

Resonance-measuring systems of the type mentioned above have been known for years, not only in the form of Coriolis mass flowmeters, but also in density-measuring devices or level monitors using the tuning fork principle, in quartz scales and band viscometers, among other things. These resonance-measuring systems are connected with a process, wherein the process and the resonance-measuring system are interactive.

In the following, resonance-measuring systems are covered using the example of Coriolis mass flowmeters, which should not be understood as being limiting. Such systems are generally termed resonance-measuring systems, in which information about the determining process variables (indicators) is encoded in the eigenfrequencies and/or such systems in which the working points are placed at the eigenfrequencies of the measuring system. The further developments described in the following can be used on all systems subject to this definition. The measuring tube of a Coriolis mass flowmeter corresponds to the oscillation element of the resonance-measuring system; this particular design of the oscillation element is also not limiting for the general teaching applicable to the resonance-measuring system.

Resonance-measuring systems designed as Coriolis mass flowmeters are used especially in industrial process measurement engineering where mass flows have to be determined with high accuracy. The functionality of Coriolis mass flowmeters is based on at least one measuring tube—oscillation element—with a flowing medium being excited to oscillation by an oscillation driver, wherein the medium having mass reacts to the Coriolis inertia force on the wall of the measuring tube caused due to the two orthogonal speeds—that of the flow and that of the measuring tube. This reaction of the medium on the measuring tube leads to a change of the measuring tube oscillation compared to the non-flow oscillation state of the measuring tube. By gathering these features of the oscillation of the Coriolis measuring tubes with flow, the mass flow through the measuring tube can be determined with high accuracy.

The eigen frequencies of the Coriolis mass flowmeters or the parts capable of oscillation of the Coriolis mass flowmeter are of particular importance, i.e., essentially the eigenfrequencies of the measuring tube, since the working point of the Coriolis mass flowmeter is normally applied to eigenfrequencies of the measuring tube in order to be able to imprint the necessary oscillation for the induction of the Coriolis forces with minimum energy effort. The oscillation executed by the measuring tube has a certain form, which is termed the eigenform of each excitation.

The oscillation behavior of the Coriolis mass flowmeter or measuring tube is determined using different system parameters, for example, using the oscillating masses, the damping and the stiffness of the eigenform of the measuring tube. These system parameters are normally in practice, however, time variant and can potentially change very quickly—or creeping—, which directly influences the quality of the measurement, in particular when the changes of these system parameters are unknown, which can be assumed for the most part. Causes for the changes of these parameters can, for example, be a change in the density of the medium, a change in the operating pressure, the operating state during filling, emptying or during operation with partial filling, a multi-phase flow of the medium—when, for example, liquid and gas-phase media are transported together—and a change in the temperature of the flowing medium. In addition to these causes essentially concerning the flow, environmental influences can also change the parameters of interest, as, for example, a temperature gradient in the mass flowmeter itself, the unintentional mechanical contact of the oscillating components with fixed parts and mechanical tension on the measuring tubes. While some of the aforementioned causal parameters for a change of the system behavior can change within seconds or even fractions of a second, other decisive factors change only very slowly, for example over a time span of many months or years; this includes, for example, erosion, corrosion of measuring tubes as well as sedimentary deposition on the measuring tubes.

A change in the fluid density, for example, causes a change in the oscillating mass of the eigenform of the measuring tube. The filling and emptying of the measuring tube as well as multi-phase flow lead to rapid changes of the damping, caused primarily by secondary flows that are induced by the different densities of the medium phases. Additionally, the viscosity of the medium can influence the damping coefficient of the measuring tube.

The stiffness of the eigenform, however, changes primarily as a function of temperature and temperature gradients as well as through mechanical tension acting on the measuring tube, such as process pressure and pulsations in the medium flow. In addition, the parameters of the Coriolis mass flowmeter change due to further influencing variables such as sedimentary deposition and erosion (erosion and corrosion).

The aforementioned examples clearly show that in order to achieve an accurate measurement result, it is necessary to know the essential system-describing parameters of the Coriolis mass flowmeter, since, inevitably, erroneous measurement results are achieved without this knowledge and a correspondingly erroneous adoption of the requirements forming the basis of the measurement.

A variety of methods are known in the prior art for determining the parameters of a system. When the structure of the system to be identified has been determined or even has been determined by a—simplified—adoption based on a model, then the required system identification is to be equivalent to the task of parameter identification, namely the identification of the system-determining parameters of the model taken as a basis.

Methods for determining the parameters of a structured system are essentially known from the prior art that work in an open loop; these types of identification methods are not suitable for carrying out a parameter identification on a Coriolis mass flowmeter during operation, at least not during controlled operation. One method for parameter identification is based on the measurement of the frequency response on the Coriolis mass flowmeter in open loop having deterministic signals. In addition, the oscillation driver is struck with a harmonic excitation signal and—after the oscillator has stabilized—the oscillation of the measuring tube is detected according to amplitude and phase as an output signal of the oscillation sensor. By mixing the output signal with a signal orthogonal to the excitation signal and after carrying out the aforementioned measurement with respectively changed measuring frequencies, the frequency response of the Coriolis mass flowmeter or its parts that can be oscillated can finally be determined. The method is very exact, but extremely time-consuming, since the system responses phase out very slowly due to the very weak damping of the measuring tube of the Coriolis mass flowmeter and, correspondingly, the time consumption for determining the parameters is quite high. Beyond that, the method is not suitable for online parameter identification due to its use in open loop.

Other methods are based on parameter identification using measurements of the frequency response using stochastic signals, wherein the Coriolis mass flowmeter is struck by a noise signal for identification. The description of the stochastic signal in a time range occurs using auto- and cross correlation functions, which describe the statistical degree of relationship between signals. Similar to the deterministic signals, a description of stochastic signals is carried out in the frequency range by using the Fourier transformation. Here, the correlations functions are subjected to the Fourier transformation and, in this manner, the corresponding power spectrums are maintained. The correlation of the auto correlation function of the output signal and the cross correlation function between output and excitation signal in the time range is given by the convolution integral with the weighting function of the system. Since the convolution in the time range corresponds to the multiplication in the frequency range, the complex frequency response can be directly calculated from the ratio of the corresponding power spectrum and, with it, corresponding parameters are identified. Compared to frequency response measurement having deterministic signals, this method is quicker due to the simultaneous excitation of the mass flowmeter to be identified in a broad frequency range, but it is also substantially less accurate. Due to the high dynamics of the Coriolis mass flowmeter and due the influence of the measuring operation by the identification, this method can only be applied during regular operation with substantial limitations.

All in all, it has been determined that known—not shown in detail here—methods for parameter identification in Coriolis mass flowmeters are not—or only with substantial limitations—suitable to be carried out during operation of the Coriolis mass flowmeter in closed loop.

SUMMARY OF THE INVENTION

Thus, a primary object of the present invention is to provide a method for operating a resonance-measuring system—in particular a Coriolis mass flowmeter—in which identification of system-describing parameters is possible during operation—i.e., online—in a closed loop.

The method according to the invention for operating a resonance-measuring system in which the above derived and described object is met, is first and essentially wherein at least one set variable of the closed loop is varied in a pre-determined manner and by evaluating at least one resulting excitation signal and/or at least one resulting response signal with the help of a mathematical model of the resonance-measuring system, at least one parameter of the excited eigenform is selectively identified.

The method according to the invention for operating a resonance-measuring system is particularly advantageous in many respects. Because identification of a parameter of the excited eigenform is determined in a closed loop, it is possible that the pre-determined course of the set variable—i.e. the pre-determined trajectory of this set variable—can be adjusted with high dynamics and simultaneously low deviation from the pre-determined course and since the dynamics of parameter identification are very high, in particular can be higher by order of magnitude than the parameter identification practiced in an open loop.

When it is said that a parameter of the excited eigenform is "selectively identified", then it is meant that the set variable of the closed loop is pre-determined so that the response of the resonance-measuring system depends only on a few parameters—in the best case only on one parameter—, i.e., the response signal is selectively sensitive in respect to this parameter or these parameters. The selectivity is thus related to the choice of parameter that is to influence the measured response signal. The pre-determined course of the set variable is imprinted on the resonance-measuring system or the oscillation element using the guideline of the set variable and application in a closed loop, the excitation signal for the oscillation driver for exciting the oscillation element to oscillation in the eigenform is virtually automatically generated by the closed loop.

In a preferred further development of the method according to the invention, the set variable is constantly varied during normal operation, in particular wherein identification of the parameters of interest—or the parameter of interest—of the excited eigenform is constantly being carried out. As opposed to known methods, identification of parameters of the eigenform in a closed loop allows for the adoption of parameters without interruption of normal operation of the resonance-measuring system in the control required for proper operation, a continuous, comprehensive control of the relevant state variables of the resonance-measuring system, its interaction with the process and its environment is possible. The "interaction with the process" corresponds to the flow through the oscillation element designed as measuring tube in resonance-measuring systems designed as Coriolis mass flowmeters.

In a preferred embodiment of the invention, the control is designed as multi-variable control or as multi-variable loop, in particular for each excited eigenform, preferably for at least two of the control variables frequency, phase and amplitude of the excited oscillation of the oscillation element in the desired eigenform. The term multi-variable is not to be understood as limiting here to any control structure, rather this can be a multiply slurred control, in which there is more than one set variable and/or more than one output variable, it can also be another control in which multiple variables are simultaneously influenced, which are coupled to one another due to the physical conditions of the section, for example, this could be a state control that does not have a classical control structure in which there is no direct comparison between set and actual value.

According to a further embodiment of the method, the phase $\phi_i$ between the excitation signal $F_i(t)$ and the response signal $y_i(t)$ of each eigenform is used in a pre-determined manner as varied set variable of the closed loop. This has been seen to be particularly advantageous since the phases between the excitation signal $F_i(t)$ and the response signal $y_i(t)$ in many resonance-measuring systems, however, in particular in Coriolis mass flowmeters, can be changed with high dynamics and thus the dynamics of a phase control loop of each eigenform is very high due to the weak damping of the eigenform and thus, the set trajectory for this phase $\phi_i$, can be adjusted at a high speed, which critically decreases the identification time for the parameter(s) of interest.

In a preferred embodiment of the method according to the invention, the set trajectory of the set phase varies between at least two values of the phase values −45°, 0° and +45°, preferably, namely varies step-like. Here, it is assumed that the phase difference is 0° quasi according to definition when the excitation occurs exactly with the eigen angular frequency $\omega_{0i}$. This is important because, depending on the used excitation signal $F_i(t)$ and the used response signal $y_i(t)$, another phase difference can also really occur by exciting the system with the eigen angular frequency $\omega_{0i}$. It is possible, for example, that the excitation signal $F_i(t)$ is really a force exerted directly on the measuring tube and the determined response signal $y_i(t)$ is a speed signal—i.e. the temporal derivation of the deflection of the measuring tube.

Independent of other variables controlled with a control loop, it has been shown to be advantageous in any case, when the excitation signal $F_i(t)$ is adjusted in an amplitude loop so that the amplitude of the oscillation of the oscillation element is essentially constant, in particular is adjusted to such a value that allows for a deformation-free and non-destructive operation of the oscillation element, preferably at a large as possible amplitude of oscillation of the oscillation element. This measure allows for the adjustment of the driving power on the current state of each eigenform. This ensures that the driving power in the resonance range of the controlled eigenform does not become to large despite a possible strong temporal variation of the eigenform, with which a deformation or destruction of the oscillation element is avoided; this is of particular importance in resonance-measuring systems designed as Coriolis mass flowmeters having a measuring tube as oscillation element. In addition, this ensures outside of the resonance that the available driving power is used completely and therewith a sufficiently high excitation of the eigenform is present for the purpose of parameter identification. Amplitude control ensures that the signal-noise-spacing is increased based on the—in the scope of compatibility—maximum deflection of the oscillation element and thus, the parameters of interest of the excited eigenform can be determined exactly.

In order to better understand the method according to the invention for operating a resonance-measuring system, it is helpful to illustrate the characteristics relevant here in the form of a mathematical-physical description, in particular because the determining of parameters of the excited eigenform is to occur based on a model anyway.

The oscillation behavior of a resonance-measuring system can be essentially mathematically described using a Lagrange Equation of the second degree, wherein each eigenform of oscillation of interest illustrates a generalized degree of freedom. In the following, the mathematical description of a resonance-measuring system is shown, by example, and with the terminology of a Coriolis mass flowmeter, which does not change the fact that the mathematical model can also be easily transferable to other resonance-measuring systems. In Coriolis mass flowmeters, an oscillation in the first eigenform corresponds, for example, to the same-phase, translational movement of the mass of the measuring or carrier tube. A rotation of the masses around the midpoint of the measuring tube corresponds to oscillation in the second eigenform. The system of differential equations for all contemplated eigenforms is in general:

$$M\underline{\ddot{x}}(t)+D\underline{\dot{x}}(t)+C\underline{x}(t)=\underline{F}(t); \quad (Eq. 1)$$

Here, M is the moment of inertia tensor, D is the damping matrix, C is the stiffness matrix and $\underline{F}$ the excitation signal in the form of a force excitation.

The use of the Fourier transformation in Eq. 1 for the initial conditions $x(0)=0$ causes an algebraization of the equations of motion. If speed sensors (e.g. magnet/coil) are used for detecting movement of the resonance-measuring system, then $\underline{\dot{x}}(t)$ is the measured response vector and the frequency response of the resonance-measuring system is:

$$G(j\omega) = \frac{V(j\omega)}{F(j\omega)} = \frac{j\omega}{-\omega^2 M + j\omega D + C}. \quad (Eq. 2)$$

Correspondingly, it is valid when deflection or acceleration sensors are used as oscillation sensor. The physical-mathematical model of the parts of interest of the Coriolis mass flowmeter is given with equations 1 and 2, on the one hand, in the time range, and on the other hand, in the frequency range, whose parameters are included in the moment of inertia tensor M the damping matrix D and the stiffness matrix C. These parameters are to be determined, since they include information about the characteristics of interest of the system. In general, i.e. the elements of the following vector are sought:

$$\underline{\theta}=f(M,D,C). \quad (Eq. 3)$$

According to a preferred embodiment of the invention, an analytical-mechanical model is used for each excited eigenform as a mathematical model for the Coriolis mass flowmeter or for the measuring tube that can be oscillated. Possible coupling of the eigenform are characterized by elements of the matrices M, D, C outside of the main diagonals. The parameters and their physical meaning, in particular for the coupling, can be exemplified using the written out equations of motion for the first and second eigenform of a Coriolis measuring tube:

$$\underbrace{\begin{bmatrix} m_1 & k_{b21} \\ k_{b12} & m_2 \end{bmatrix}}_{M} \underbrace{\begin{bmatrix} x\ddot{Y}_1 \\ x\ddot{Y}_2 \end{bmatrix}}_{x\ddot{Y}(t)} + \underbrace{\begin{bmatrix} d_1 & k_{v21}+k_{cor21} \\ k_{v12}+k_{cor12} & d_2 \end{bmatrix}}_{D} \underbrace{\begin{bmatrix} x\dot{Y}_1 \\ x\dot{Y}_2 \end{bmatrix}}_{x\dot{Y}(t)} + \quad (Eq. 4)$$

$$\underbrace{\begin{bmatrix} c_1 & k_{s21} \\ k_{s12} & c_2 \end{bmatrix}}_{C} \underbrace{\begin{bmatrix} x_1 \\ x_2 \end{bmatrix}}_{x(t)} = \underbrace{\begin{bmatrix} F_1 \\ F_2 \end{bmatrix}}_{F(t)}$$

Here, $m_i$ is the oscillating mass of each eigenform, $d_i$ is the damping constant of each eigenform, $c_i$ is the spring constant of each eigenform, $k_{xxx}$ are the acceleration-, speed- and path-coupling of the eigenforms ($k_{cofxx}$ are speed proportional couplings, which are proportional to the mass flow) and $F_i$ is the excitation force of each eigenform.

The method according to the invention for operating a Coriolis mass flowmeter is not limited to a model-based description of the excited eigenform according to the above equations; rather the method can be correspondingly used for all appropriate physical-mathematical models of the Coriolis mass flowmeter.

The couplings of the eigenform take place using the elements of the matrices M, D and C outside of the main diagonal. The couplings take place physically/constructively either using a non-intended asymmetry in the construction of the Coriolis mass flowmeter or using a mass flow. The elements responsible for the couplings are formed from the differences of oscillating masses and damping and spring constants of the measuring tube halves and are normally very small in comparison to the corresponding parameters $m_i$, $d_i$ and $c_i$.

For reasons of simplicity, in the case of multiply excited eigenforms, the couplings of the eigenforms are initially neglected for selective determination, through which the matrices M, D and C become diagonal matrices. Then, the individual eigenforms can each be described using a transfer function of the second degree, which is why the transfer function of the i-th eigenform is:

$$G_i(j\omega) = \frac{V_i(j\omega)}{F_i(j\omega)} = \frac{j\omega}{-\omega^2 m_i + j\omega d_i + c_i}. \quad \text{(Eq. 5)}$$

The transfer function for the i-th eigenform according to equation 5 has three parameters, which are determined by the spring constant $c_i$, the oscillating mass $m_i$ and the damping coefficient $d_i$.

An ideal type of excitation of the measuring tube to oscillation in each eigenform for selective identification is the pre-determined variation and guideline of the phase $\phi_i$ between the excitation signal $F_i(t)$ and the response signal $y_i(t)$, wherein, in a preferred design of the invention, the set trajectory of the set phase $\phi_{i,soll}$ is varied between at least two values of the phase values $-45°$, $0°$ and $+45°$, preferably steplike varied. The set phase can adopt the values, for example, $0°$, $+45°$, $0°$, $-45°$, $0°$ etc. in its temporal sequence, wherein the set phase remains respectively for a pre-determined time at the respective value and then is varied steplike to the next value. The choice of a set trajectory calculated for the phase is preferred because the eigenforms are very weakly damped and the course of the phases close to the eigenfrequencies (phase value $0°$) run very steep at the turning point of a trigonometric arc tan function and the corresponding phase control are very fast as a result.

According to the previous example, the transfer function of the eigenform according to equation 5 is only evaluated for the three settled phases $-45°$, $0°$ and $+45°$, for which the following converted transfer function presents:

$$j\omega m_i + d_i - j\frac{c_i}{\omega} = \frac{1}{|G_i(j\omega)|} e^{-j\varphi_i} \quad \text{(Eq. 6)}$$

The result for the three phases $-45°$, $0°$ and $+45°$ are then the following correlations:

$$\varphi_{i,soll} = 45° \Rightarrow j\omega_{0i_{+45}} m_i + d_i - j\frac{c_i}{\omega_{0i_{+45}}} = \frac{1}{|G_i(j\omega_{0i_{+45}})|} e^{-j45}, \quad \text{(Eq. 7)}$$

$$\varphi_{i,soll} = 0° \Rightarrow j\omega_{0i} m_i + d_i - j\frac{c_i}{\omega_{0i}} = \frac{1}{|G_i(j\omega_{0i})|} e^{-j0} \text{ and} \quad \text{(Eq. 8)}$$

$$\varphi_{i,soll} = -45° \Rightarrow j\omega_{0i_{-45}} m_i + d_i - j\frac{c_i}{\omega_{0i_{-45}}} = \frac{1}{|G_i(j\omega_{0i_{-45}})|} e^{j45}. \quad \text{(Eq. 9)}$$

With the above equations, it can be seen that the set phase $\phi_{i,soll}$ of each eigenform is achieved using variations of the frequency of the excited oscillation, presently, preferably using variations of the frequency of the excitation signal at the eigen angular frequency $\omega_{0i}$, wherein, here, in particular, the phase angular frequencies $\omega_{0i_{-45}}°$ and $\phi_{0i_{+45}}°$ set for achieving each set phase $\phi_{i,soll}$ are used to determine a parameter of the excited eigenform.

Using equation 8, it can be seen that a very good selective excitation in respect to the parameter $d_i$ is given by a guideline for the phase $\phi_i$ of $0°$, since the right side of equation 8 is real-valued, through which the damping parameter $d_i$ can be calculated directly from the measured excitation signals and response signals as it were:

$$d_i = \frac{1}{|G_i(j\omega_{0i})|} e^{-j0} = \frac{|F_i(j\omega_{0i})|}{|V_i(j\omega_{0i})|} \quad \text{(Eq. 10)}$$

In respect to the excitation of the oscillation element or the measuring tube having set phase values of $-45°$ and $+45°$ between the excitation signal and the response signal, equations 7 and 9 also have special characteristics, which makes the excitation in respect to the parameters of damping also appear as being selective. In both equations, the amounts of real and imaginary parts are the same for this special excitation. With this, the damping parameter $d_i$ can be directly calculated from equations 7 and 9, as is given in the following:

$$d_i = \frac{\sqrt{2}}{2} \frac{|F_i(j\omega_{0i_{+45}})|}{|V_i(j\omega_{0i_{+45}})|} \text{ or} \quad \text{(Eq. 11)}$$

$$d_i = \frac{\sqrt{2}}{2} \frac{|F_i(j\omega_{0i_{-45}})|}{|V_i(j\omega_{0i_{-45}})|} \quad \text{(Eq. 12)}$$

Due to the simple selective determination of damping as parameter, it is provided in a preferred design of the method according to the invention that damping is selectively identified as the first parameter so that further parameters can be more easily determined using the knowledge of the determined damping.

The parameters $m_i$ and $c_i$ can be determined by means of equations 7 to 9 and the related frequencies required for producing the respective set phase situation—eigen angular frequency $\omega_{0i}$ and phase angular frequencies $\omega_{0i_{-45}}$ and $\omega_{0i_{+45}}$—, according to the following equations:

$$m_i = \frac{1}{\omega_{0i_{-45}} - \omega_{0i_{+45}}} d_i \text{ and} \quad \text{(Eq. 13)}$$

$$c_i = \frac{\omega_{0i_{+45}} \omega_{0i_{-45}}}{\omega_{0i_{-45}} - \omega_{0i_{+45}}} d_i. \quad \text{(Eq. 14)}$$

Alternatively, a determination of the spring constant $c_i$ of the respective eigenform can be established using the measured excitation and response signals and, as it were, according to the following correlations:

$$c_i = \frac{\omega_{0i_{+45}} \omega_{0i_{-45}}}{\omega_{0i_{-45}} - \omega_{0i_{+45}}} \frac{|F_i(j\omega_{0i})|}{|V_i(j\omega_{0i})|}, \quad \text{(Eq. 15)}$$

$$c_i = \frac{\sqrt{2}}{2} \frac{\omega_{0i}^2 \omega_{0i_{+45}}}{\omega_{0i}^2 - \omega_{0i_{+45}}^2} \frac{|F_i(j\omega_{0i_{+45}})|}{|V_i(j\omega_{0i_{+45}})|} \text{ or} \quad \text{(Eq. 16)}$$

-continued $$c_i = -\frac{\sqrt{2}}{2} \frac{\omega_{0i}^2 \omega_{0i_{-45}}}{\omega_{0i}^2 - \omega_{0i_{-45}}^2} \frac{|F_i(j\omega_{0i_{-45}})|}{|V_i(j\omega_{0i_{-45}})|}.$$ (Eq. 17)

Correspondingly, the parameter of the oscillating mass $m_i$ can also be established from the measured excitation and response signals in the pre-determined set phases, for example using:

$$m_i = \frac{1}{\omega_{0i_{-45}} - \omega_{0i_{+45}}} \frac{|F_i(j\omega_{0i})|}{|V_i(j\omega_{0i})|},$$ (Eq. 18)

$$m_i = \frac{\sqrt{2}}{2} \frac{\omega_{0i_{+45}}}{\omega_{0i}^2 - \omega_{0i_{+45}}^2} \frac{|F_i(j\omega_{0i_{+45}})|}{|V_i(j\omega_{0i_{+45}})|} \text{ or}$$ (Eq. 19)

$$m_i = -\frac{\sqrt{2}}{2} \frac{\omega_{0i_{-45}}}{\omega_{0i}^2 - \omega_{0i_{-45}}^2} \frac{|F_i(j\omega_{0i_{-45}})|}{|V_i(j\omega_{0i_{-45}})|}.$$ (Eq. 20)

In preferred designs of the invention, the selective identification of each parameter of interest of the excited eigenform occurs in the completely oscillated state since this makes the evaluation generally easier. This is advantageously possible in particular when the phase between the excitation signal and the response signal of the respective eigenform is used as a varied set variable, since the phase can change very dynamically based on correlations described in the introduction and, thus, can be set with a high control speed.

The above examples described according to equations for a selective identification of a parameter of the excited eigenform are only representative of other possibilities of selective identification for parameters of interest of an excited eigenform. In this manner, the method according to the invention is neither limited to the pre-determined variation of the phase between excitation signal and response signal of the oscillation element or the measuring tube, nor the values of the set phase −45°, 0° and +45° given here as an example, nor the evaluation of only stationary set values. There are further advantageous values as guidelines for the phase between excitation signal and response signal, which allow a selective identification of parameters of the excited eigenform, just as evaluation of transient processes, i.e., still found in transition is possible for selective online parameter identification.

A particular advantage of the method according to the invention is that in addition to the determination of parameters of the excited eigenform during control operation of the Coriolis mass flowmeter a further analysis of the state of the Coriolis mass flowmeter is also allowed. In this manner, at least one derived parameter is identified from the selectively identified parameters in a further development of the method according to the invention, in particular, a flow parameter, such as mass flow, density, pressure, viscosity, multi-phase flow and/or a device parameter for erosion, corrosion, sedimentary deposition, partial filling and mechanical contact of the oscillating components with fixed parts and/or an environmental parameter such as pulsation of a pump during operation of the Coriolis mass flowmeter.

In addition to the above parameters, the eigen angular frequency $\omega_{0i}$ of each eigenform can also be determined as a parameter of interest, wherein the determined eigen angular frequency $\omega_{0i}$, in particular, by excitation of the measuring tube into oscillation, is taken into account in the corresponding eigenform.

A particularly meaningful derived parameter for an oscillating system is its quality. In an advantageous design of the method according to the invention, the quality factor $Q_i$ of the excited eigenform of the measuring tube is thus determined as a derived parameter, wherein, in general the quality factor is given by the ratio of the energy stored in it to the dissipated— i.e. lost—energy per period:

$$Q = 2\pi \frac{E_{gesp.}(t)}{E_{Verlust}(t)}.$$ (Eq. 21)

Used on the measuring tube of a Coriolis mass flowmeter that is excited to oscillation in an eigenform, the following correlation for the quality factor results based on the above-mentioned model without consideration of coupling:

$$Q_i = 2\pi \frac{E_{gesp.}(\omega_{0i})}{E_{Verlust}(\omega_{0i})} = \frac{m_i \omega_{0i}}{d_i}.$$ (Eq. 22)

According to equation 22, the quality factor $Q_i$ of the excited eigenform is determined from the values for the oscillating mass $m_i$, the damping $d_i$ and the eigen angular frequency $\omega_{0i}$ of the excited eigenform. When the oscillating mass $m_i$ and the damping $d_i$ are replaced by the above given determination equations, the following determination equations for the quality factors of the eigenform are obtained, which are dependent only on the eigen angular frequency $\omega_{0i}$ and the phase angular frequencies $\omega_{0i_{-45}}$ and $\omega_{0i_{+45}}$:

$$Q_i = \frac{\omega_{0i}}{\omega_{0i_{-45}} - \omega_{0i_{+45}}},$$ (Eq. 23)

$$Q_i = \frac{\omega_{0i}\omega_{0i_{+45}}}{\omega_{0i}^2 - \omega_{0i_{+45}}^2} \text{ or}$$ (Eq. 24)

$$Q_i = -\frac{\omega_{0i}\omega_{0i_{-45}}}{\omega_{0i}^2 - \omega_{0i_{-45}}^2}.$$ (Eq. 25)

According to the above determination equation, the quality factor $Q_i$ of the excited eigenform can also be determined from the ratio of the determined eigen angular frequency $\omega_{0i}$ to the band width of the determined phase angular frequencies—difference of the determined phase angular frequencies—or from another suitable combination of the value for the eigen angular frequency $\omega_{0i}$ and at least one determined value for a phase angular frequency. It is emphasized here that the determination of quality factors of the excited eigenform is independent of the characteristics of the measuring part and actuator, since equations 23 to 25 do not include values of the measured excitation and response signals and the phase shift due to measuring parts is negligibly small.

The calculated quality factors $Q_i$ can be used for the correction of flow parameters as well as for quantifying the state of the flow meter in its entire life cycle from production to withdrawal from service. The determined quality factor $Q_i$ can be used as a meaningful, derived system parameter for purposes of diagnosis, for example in maintenance. The equations 23 to 25 for calculating the quality factor have, in the case of stationarity of the Coriolis mass flowmeter, identical results—i.e. when all parameters of the eigenforms are constant. If the Coriolis mass flowmeter is not stationary due to environmental and/or process influences, such as, e.g., temperature, then equation 23 results in a mean value for the quality factor $Q_i$ of the excited eigenform, and according to equation 26, the difference of the equations 24 and 25 is a measure for the instationarity of the Coriolis mass flowmeter:

$$I_M = \frac{\omega_{0i}\omega_{0i_{+45}}}{\omega_{0i}^2 - \omega_{0i_{+45}}^2} + \frac{\omega_{0i}\omega_{0i_{-45}}}{\omega_{0i}^2 - \omega_{0i_{-45}}^2}. \quad \text{(Eq. 26)}$$

The instationarity can, for example, be caused by different parameter variations—for example, as the result of temperature influences—or by inhomogeneities in the flow.

All in all, the quality factor $Q_i$ calculated in this manner can be used for correcting the flow parameter as well as for setting—balancing—the Coriolis mass flowmeter in certain phases of production—e.g. calibration—or as an application, for example, for detecting air pockets or by the diagnosis, for example, for identifying contact of the oscillation components with the mounting.

In a further advantageous design, the method according to the invention also allows identification of the parameter for the Coriolis coupling $k_{Cor12}$ and/or for the acceleration coupling $k_{b12}$ of the first excited eigenform to the second excited eigenform, wherein the parameter is identified particularly frequency- and phase selectively.

In order to identify the Coriolis coupling $k_{Cor12}$ and the acceleration coupling $k_{b12}$ from the first eigenform to the second eigenform, it is initially assumed that the coupling of the motion of the second eigenform to the first eigenform can be nearly neglected due to the forced excitation of the first eigenform. The determining equation is as follows:

$$j\left(\omega m_1 - \frac{c_1}{\omega}\right) + d_1 = \frac{F_1}{V_1} \quad \text{(Eq. 27)}$$

$$(j\omega k_{b12} + k_{cor12})V_1 + \left(j\left(\omega m_2 - \frac{c_2}{\omega}\right) + d_2\right)V_2 = F_2$$

The first coupling described by the parameter $k_{Cor12}$—Coriolis coupling—is standard for mass flow measurement and the second coupling described by the parameter $k_{b12}$—acceleration coupling—describe the asymmetry of the masses of both measuring tube halves, regardless of how the asymmetry of the masses occurred. This coupling is a quality feature for the balance of the measuring tube and can be used to balance the second eigenform of the Coriolis mass flowmeter. In order to determine both couplings, the first and the second eigenforms of the measuring tubes—for example, with the phase courses described above—are excited and the response signal is frequency and phase selectively evaluated. The parameters for each the oscillating masses $m_1$, $m_2$, the damping $d_1$, $d_2$ and the stiffness $c_1$, $c_2$ can be determined, for example, using the equations (equations 10 to 20) described above. The determining equations for the parameter of the couplings $k_{cor12}$ and $k_{b12}$ result out of the correlations according to equation 28:

$$(j\omega_{01}k_{b12} + k_{cor12})V_1(j\omega_{01}) + \quad \text{(Eq. 28)}$$

$$\left(j(\omega_{01}m_1 - \frac{c_2}{\omega_{01}}) + d_2\right)V_2(j\omega_{01}) = 0.$$

Two determining equations can be obtained from this correlation, when the real and imaginary parts of the measured variables are used:

$$k_{cor12} = \left(\omega_{01}m_2 - \frac{c_2}{\omega_{01}}\right)\frac{V_{2Im\omega_{01}}}{V_{1Re\omega_{01}}} - d_2\frac{V_{2Re\omega_{01}}}{V_{1Re\omega_{01}}} \quad \text{(Eq. 29)}$$

$$k_{b12} = -\left(m_2 - \frac{c_2}{\omega_{01}^2}\right)\frac{V_{2Re\omega_{01}}}{V_{1Re\omega_{01}}} - \frac{d_2}{\omega_{01}}\frac{V_{2Im\omega_{01}}}{V_{1Re\omega_{01}}}.$$

Here, $V_{1Re\omega_{01}}$ is the real part of the speed of the first eigenform at the resonance frequency of the first eigenform and $V_{2Re\omega_{01}}$ is the real part and $V_{2Im\omega_{01}}$ is the imaginary part of the speed of the second eigenform at the resonance frequency of the first eigenform.

In a preferred embodiment of the invention, it is provided that equation 29 is also evaluated at the resonance frequency of the first eigenform with a phase of +/−45°, so that respectively two further determining equations for the coupling are obtained. The values for the couplings obtained from the different determining equations can be summarized to weighted means of the coupling by calculating a mean.

Initially, it has already been described that the identifying parameter in certain designs of the method are used to determine different derived parameters, namely flow parameters, device parameters and/or environmental parameters.

The stiffness of the eigenform according to equations 15 to 17 are used as indicator for a symmetrical corrosion and erosion in a preferred design of the method. An asymmetrical sedimentary deposition of the measuring tube is determined according to another further development of the method via an accelerating coupling—for example via the parameter $k_{b12}$ according to equation 29. Asymmetrical corrosion and erosion are determined further using the identification of the deflection proportional coupling of the eigenform—for example via the parameter $k_{s12}$.

The method described above for operating a Coriolis mass flowmeter with online parameter identification can be arbitrarily enhanced. In a further design of the method it is provided, for example, that in order to determine all parameters of the first and second eigenform, the first and second eigenform having the described set phase courses—steplike formed variations of the value for the set phases—are excited and all of the response signals are frequency and phase selectively evaluated. Here, a total of 25 determining equations for all parameters of the first and the second eigenform result from the previous description. With these, the parameters of interest can be calculated using different algorithms, in a preferred design, for example, using the recursive least square method (RLS).

As has been mentioned, other trajectories for the phases, amplitudes and, in general, for the output signal of each eigenform can be implemented, wherein not only stationary states of the excitatation signals and the output signals can be evaluated, rather the information included in the dynamics of the excitation and response signals can be used by means of different algorithms for selective identification of parameters as, for example, the extended Kalman filter (EKF) or the moving horizon method.

The derived object is further met with the Coriolis mass flowmeter described in the introduction in that this Coriolis mass flowmeter is designed so that it can be operated with one of the methods described above.

Now, in detail, there are different possibilities for designing and further developing the method according to the invention as will be apparent from the following detailed description of preferred embodiments in connection with the accompanying drawings.

DETAILED DESCRIPTION OF THE INVENTION

Figure 1:
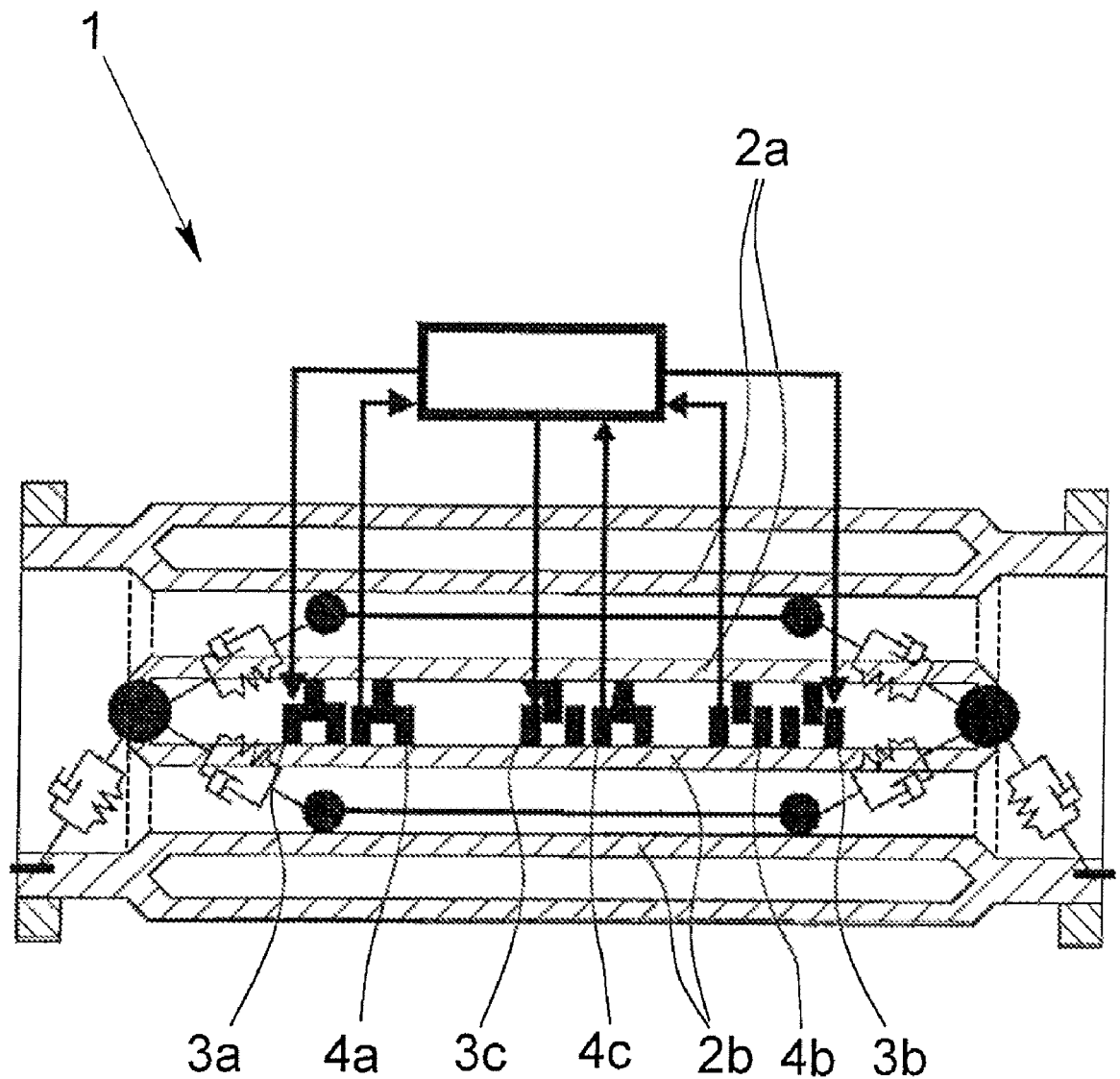
FIG. 1 is a schematic representation of a resonance-measuring system designed as Coriolis mass flowmeter having indicated equivalent circuit variables for forming a model.

FIG. 1 shows a schematic representation of a Coriolis mass flowmeter 1 that is treated representatively for a general resonance measuring system and that is operated using the method being described here. Presently, the Coriolis mass flowmeter 1 has two measuring tubes 2a, 2b as oscillating elements interacting with the medium flow, three oscillation drivers 3a, 3b, 3c and three oscillation sensors 4a, 4b, 4c. The measuring tubes 2a, 2b are excited to oscillation in at least one eigenform by the oscillation drivers 3a, 3b, 3c by an excitation signal $F_i(t)$ in a control in a—first illustrated in detail in FIG. 3—control loop 5, and the excited oscillation of the measuring tubes 2a, 2b is detected by the oscillation sensors 4a, 4b, 4c as a response signal $y_i(t)$ or as multiple response signals $y_i(t)$. In the measuring tubes 2a, 2b, the first eigenform of the excited oscillation forms only one bulge and the second eigenform forms an oscillation in which a central nodal point of the oscillation is additionally formed.

The number of oscillation drivers 3a, 3b, 3c and oscillation sensors 4a, 4b, 4c depends, generally, on which eigenform of the oscillation of the measuring tubes 2a, 2b can be excited and observed. The arrangement shown in FIG. 1 makes it possible, at any rate, to excite the Coriolis measuring tube in a first eigenform and in a second eigenform of the oscillation and to observe these oscillations.

A medium flow (not shown) is guided by the measuring tubes 2a, 2b, wherein the medium having mass reacts on the measuring tubes 2a, 2b due to the Coriolis forces on the measuring tubes 2a, 2b created by the oscillation of the measuring tubes 2a, 2b. The mass flow can be determined using a measurement of a time different of the oscillation in each eigenform in the in- and out flowing side section of the measuring tubes 2a, 2b.

In addition to the structure of the Coriolis mass flowmeter 1, the corresponding spring-mass system is also indicated superimposed in FIG. 1. The masses of the measuring tubes 2a, 2b of the merging flanges are indicated. The spring coupling of the masses to one another are symbolized by spring-damper elements. The spring-mass system of the Coriolis mass flowmeter 1 or the oscillating measuring tubes 2a, 2b indicated in FIG. 1 is illustrated again in FIG. 2 in detail with formula symbols.

Figure 2:
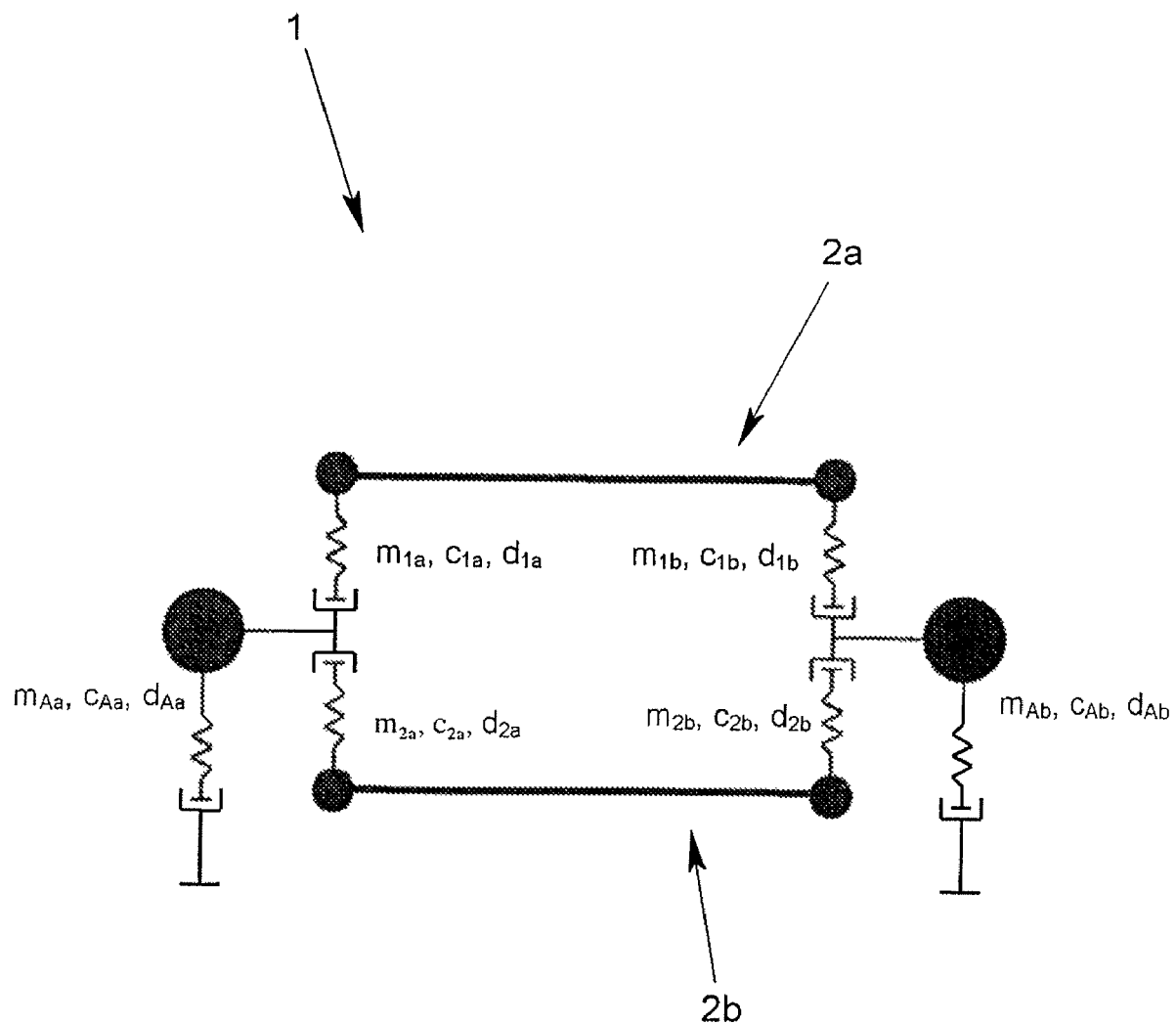
FIG. 2 is a mechanical equivalent circuit diagram with concentrated parameters in the form of a spring-mass system of the Coriolis mass flowmeter shown in FIG. 1 as mathematical-physical model.

In FIG. 2, it is indicated by signal lines provided with a sense of direction that the excitation signals $F_i(t)$ and the response signals $y_i(t)$ generated by the oscillation sensors 4a, 4b, 4c can be exchanged between a central processing unit not described here of the Coriolis mass flowmeter 1 and the oscillation drivers 3a, 3b, 3c, on the one hand, and the oscillation sensors 4a, 4b, 4c, on the other hand.

The oscillating masses m, the damping d and the stiffness parameter c occur as parameters of the mathematical-physical model illustrated in FIG. 2. A possible mathematical formulation of the models illustrated in FIG. 2 has been described in detail in the general part and can be easily transferred to the Coriolis mass flowmeter 1 having two strait measuring tubes 2a, 2b illustrated here, which each can be excited to oscillation in different eigenforms.

For the operation of the Coriolis mass flowmeter, it is important to always be informed of the state of the Coriolis mass flowmeter and to immediately identify changes in the Coriolis mass flowmeter—primarily in controlled operation—whether it is to be able to correctly determine flow parameters with the knowledge of these changes, or to learn about device parameters, for example in the scope of diagnosis and maintenance, or in order to be able to promptly detect environmental parameters, such as, e.g., the pulsation of a pump.

For this, it is provided that a set variable of the closed control loops 5a, 5b, 5c is varied in a pre-determined manner and by evaluating at least one resulting excitation signal $F_i(t)$ and/or at least one resulting response signal $y_i(t)$ using the help of a mathematical model of the Coriolis mass flowmeter, at least one parameter of the excited eigenform can be selectively identified.

Figure 3:
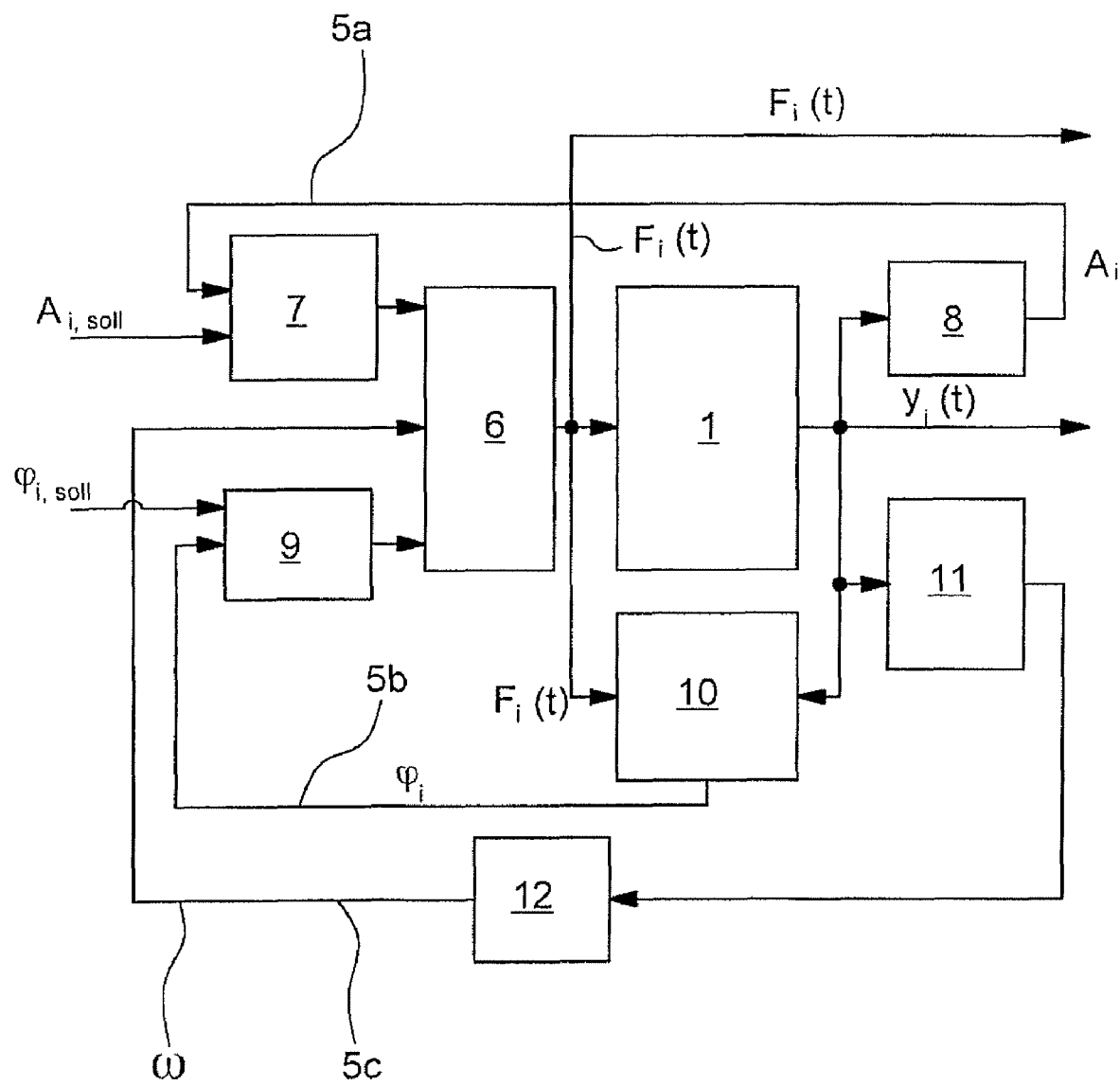
FIG. 3 is a block diagram of the method according to the invention for controlled operation of a Coriolis mass flowmeter in the form of a block diagram.

The activation of the measuring tube 2a, 2b or the parts of the Coriolis mass flowmeter 1 that can be excited to oscillation is initially illustrated in FIG. 3 by a control in a control loop 5, wherein the Coriolis mass flowmeter 1 is only shown as a block that receives the excitation signal $F_i(t)$ as input variable and responds to the excitation with the response signal $y_i(t)$ as output signal. The excitation signal $F_i(t)$ can be multiple excitation signals $F_i(t)$, if it is necessary to activate multiple oscillation drivers 3a, 3b, 3c for exciting a certain eigenform. The excitation signal $F_i(t)$ is generated by a signal generator 6.

The control illustrated in FIG. 3 is a multi-variable control in a total of three control loops 5a, 5b, 5c, wherein the amplitude controller 7 in the amplitude control loop 5a adapts the amplitude $A_i$ of the excited eigenform detected via amplitude measurement 8 to the pre-set value $A_{i,soll}$. In the same manner, the phase controller 9 adapts the pre-set value for the set phase $\phi_{i,soll}$ between the excitation signal $F_i(t)$ and the response signal $y_i(t)$ to the value of the actual phase $\phi_i$, determined by the phase detector 10.

Using an estimator 11 for the resonance frequencies of the excited eigenforms, the resonance frequencies of each eigenform are estimated—e.g., via the detection of zero crossings or by means of observation methods—and a servo control 12 of each eigenform is carried out. The servo control 12 of the signal generators 6 occurs using a priori knowledge of the used Coriolis mass flowmeter which, for example, exists in theoretically calculated or experimentally determined value ranges for the model parameters—so that, at any rate, an excitation of the Coriolis mass flowmeter is achieved by the servo control 12 that is suitable for an eigenform to be excited, if this is operated without interruption (i.e. is operated, e.g. at the nominal flow and at the nominal temperature and no other deviations from the basis-forming assumptions are present). On the one hand, a pre-selection of the eigenforms occurs and, on the other hand, the dynamics of deviation control are increased by this servo control 12.

Figure 4:
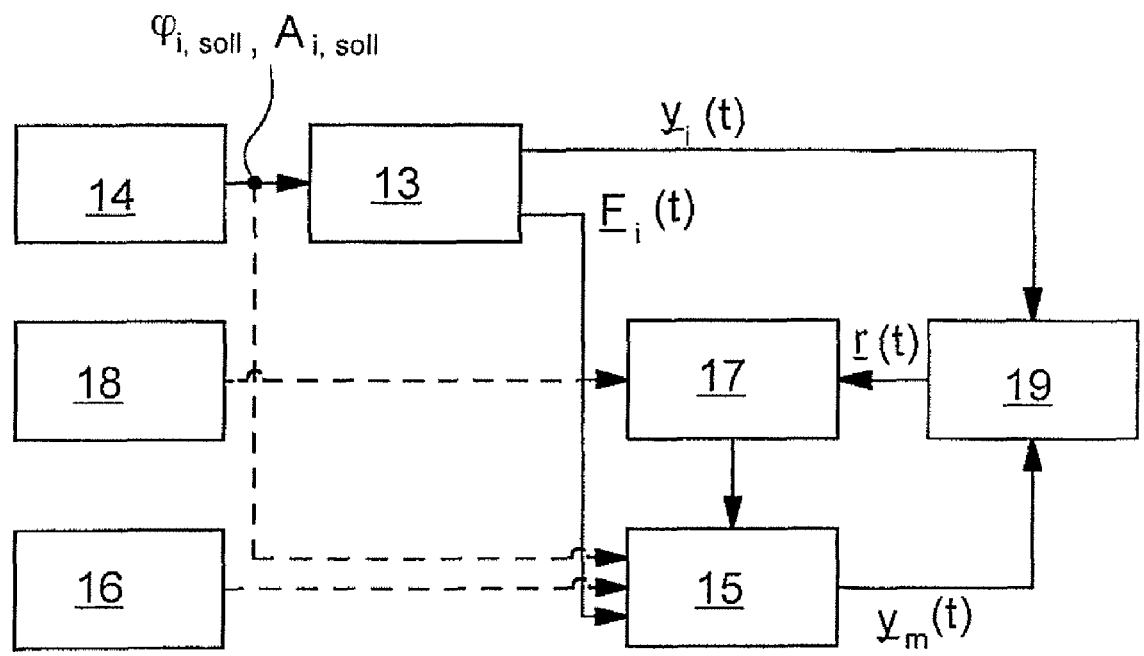
FIG. 4 is another block diagram of the method according to the invention, based on FIG. 3, having additions respective to parameter identification.

In FIG. 4, the controlled course illustrated in FIG. 3—i.e., the controlled Coriolis mass flowmeter 1 is only illustrated as a block 13. The Coriolis mass flowmeter 13 provided with a control is exposed to a set trajectory generator 14, in the present case, using guidelines of set-trajectories in which the set value $\omega_{i}$ is varied in a pre-determined manner.

Figure 5:
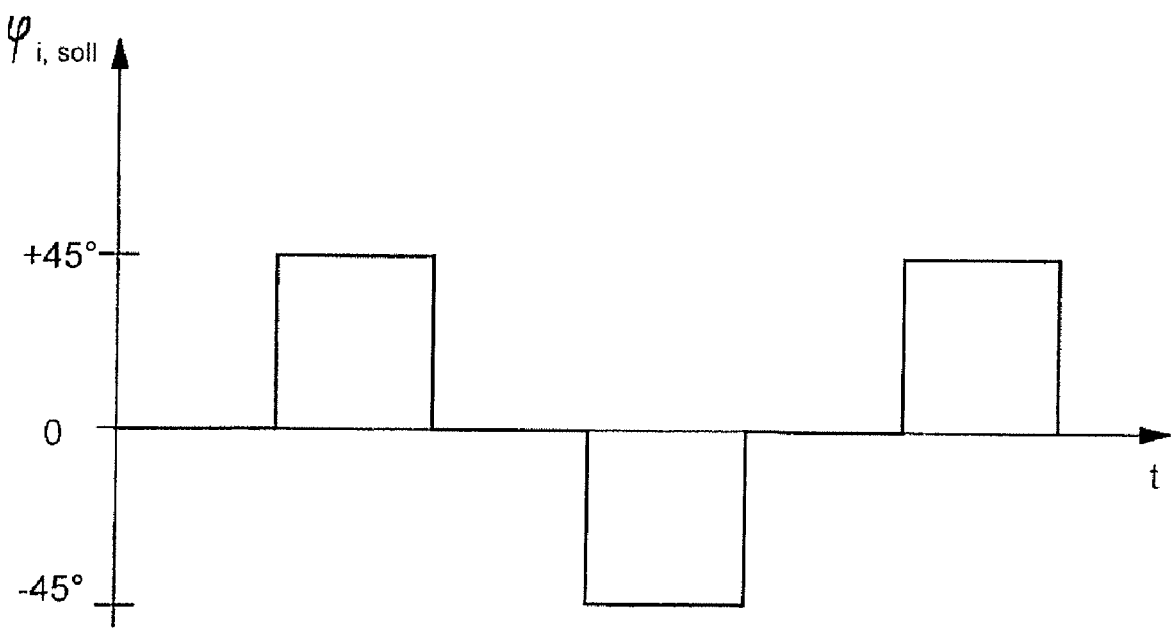
FIG. 5 is a graph of an exemplary course of the set trajectory for variation of the phase between an excitation signal and a response signal as the set variable of the closed control loop.

That parameters of the excited eigenform can be selectively identified, is due to the clever choice of pre-determined variations of the set variable, here, i.e., the set phase $\phi_{i,soll}$ between the excitation signal $F_i(t)$ and the response signal $y_i(t)$ of each eigenform, wherein, presently, the set trajectory of the set phase $\phi_{i,soll}$ is varied between the phase values $-45°$, $0°$ and $+45°$, as is given in FIG. 5. The set phase $\phi_{i,soll}$ of each eigenform is set here using suitable adjustment of the frequency of the excited oscillation, namely using the variation of the frequency of the excitation signal $F_i(t)$ around the eigen angular frequency $\omega_{0i}$.

The method illustrated in FIG. 4 by a block diagram for selective online identification of parameters of the excited eigenform is based on a mathematical model 15, which is formed from a certain model structure 16—modeling the eigen-oscillation of the measuring tube 2a, 2b using Lagrange equations of the second degree—and concrete values for the parameters occurring in the structure. The parameters of the mathematical model forming the basis are determined by means of an identification algorithm 17—if necessary, using a-priori information 18 as a guideline—in which the actual response signal $y_i(t)$ and the response signal $y_M(t)$ of the model are compared with one another in a reference junction 19 and the deviation $r(t)$ is used for further identification of the model parameters of interest—and with this, the actual parameters of the Coriolis mass flowmeter.

It can be seen in the scope of the derivatives of the determining equations for the parameters damping $d_i$, oscillating masses $m_i$ and stiffness $c_i$ of each excited eigenform illustrated in the general description how simple parameter identification is in a Coriolis mass flowmeter 13 found in control operation. In the embodiment shown here, the set variable of the phase during control operation is continuously—as is shown in FIG. 5—varied and identification of the parameter of the excited eigenform is simultaneously carried out.

The control illustrated in FIG. 3 and the connected evaluation for determining parameters of interest of the excited eigenform illustrated in FIG. 4 are separately implemented for each excited eigenform, which is indicated by the index i for the i-th eigenform.

Determination of damping $d_i$ of the excited eigenform is carried out with the guideline for the set variable of the phase $\phi_i$ in FIG. 5 using the correlation according to equation 10, where the excitation with the eigen angular frequency $\omega_{0i}$ is sufficient. Additionally, the damping parameter can, however, be calculated at other values for the set phase according to correlations from equations 11 and 12, wherein the phase angular frequencies $\omega_{0i-45}$ and $\omega_{0i+45}°$ have to be used, these loop frequencies are, however, immediately available since they are automatically adapted. The further parameters of the excited eigenform are then determined using equations 13 to 20 and the values obtained in different ways for these parameter are, if necessary, averaged.

It is of particular importance here that, in the method for operating the Coriolis mass flowmeter according to FIG. 1 illustrated in FIGS. 3 and 4, subsequent derived parameters are identified from the selectively identified parameters. In the present case, the quality factor $Q_i$ of the excited eigenform, inter alia, is determined as derived parameter, namely from the values for oscillating masses $m_i$, damping $d_i$ and the eigen angular frequency $\omega_{0i}$ of the excited eigenform. By determining the quality factor, it is possible to detect changes in the state of the Coriolis mass flowmeter, for example during production, calibrations and running diagnosis.

FIG. 1 shows, in total, a Coriolis mass flowmeter, in which the method described above for operating a Coriolis mass flowmeter is implemented, namely implemented according to FIGS. 3 and 4.

What is claimed is:

1. Method for operating a resonance-measuring system wherein the resonance-measuring system includes at least one oscillation element, at least one oscillation driver and at least one oscillation sensor, comprising the steps of:
   exciting the oscillation element to oscillation in at least one eigenform from at least one control in at least one control loop by at least one oscillation driver excited by at least one excitation signal $F_i(t)$
   detecting the excited oscillations of the oscillation element with the oscillation sensors as at least one response signal $y_i(t)$,
   varying at least one set variable of the closed loop in a pre-determined manner, and
   selectively identifying at least one parameter of the excited eigenform by evaluating at least one of at least one resulting excitation signal $F_i(t)$ and at least one resulting response signal $y_i(t)$ with the help of a mathematical model of the resonance-measuring system.

2. Method according to claim 1, wherein the set variable is constantly varied during normal operation and wherein identification of the parameters of the excited eigenform is constantly carried out.

3. Method according to claim 1, wherein the control comprises a multi-variable loop for every excited eigenform.

4. Method according to claim 3, wherein the excitation signal $F_i(t)$ is adjusted in an amplitude loop so that the amplitude $A_i$ of the oscillation of the oscillation element is essentially constant.

5. Method according to claim 1, wherein the phase $\phi_i$ between the excitation signal $F_i(t)$ and the response signal $y_i(t)$ of the respective eigenform is used as a set variable.

6. Method according to claim 5, wherein the set phase $\phi_i$ of each eigenform is achieved by variation of the frequency of the excited oscillation.

7. Method according to claim 1, wherein the selective identification of each parameter of the excited eigenform occurs in a steadily oscillating state.

8. Method according to claim 1, wherein an analytical-mechanical model is used for each excited eigenform as a mathematical model for the resonance-measuring system.

9. Method according to claim 8, wherein damping is selectively identified as the first parameter.

10. Method according to claim 1, wherein derived parameters are identified from the selectively identified parameters.

11. Method according to claim 10, wherein the eigen angular frequency $\omega_{0i}$ of each eigenform is determined as a derived parameter.

12. Method according to claim 10, wherein a quality factor $Q_i$ of the excited eigenform is determined as a derived parameter.

13. Method according to claim 10, wherein an instationarity of the resonance-measuring system is determined as a derived parameter.

14. Method according claim 1, wherein the resonance-measuring system is a Coriolis mass flowmeter, at least one of a Coriolis coupling $k_{Cor12}$ and an acceleration coupling $k_{b12}$ of the first excited eigenform to the second excited eigenform are identified.

15. Method according to claim 1, wherein derived parameters are identified from the selectively identified parameters and wherein the resonance-measuring system is a Coriolis mass flowmeter, and the derived parameters are at least one of mass flow, density, pressure, viscosity, multi-phase flow.

16. Resonance-measuring system, comprising
- an oscillation element
- at least one measuring tube with a flowing medium as an oscillation element,
- at least one oscillation driver,
- at least one oscillation sensor,
- wherein the oscillation element is excitable to oscillation in at least one eigenform from at least one control in at least one control loop by the at least one oscillation driver excited by at least one excitation signal $F_i(t)$ and the oscillation sensors being adapted to detect the excited oscillations of the oscillation element as at least one response signal $y_i(t)$, and
- an evaluation means for selectively identifying at least one parameter of the excited eigenform by evaluating at least one of at least one resulting excitation signal $F_i(t)$ and at least one resulting response signal $y_i(t)$ using a mathematical model of the resonance-measuring system.

* * * * *